(12) United States Patent
Doelitsch

(10) Patent No.: US 11,407,361 B2
(45) Date of Patent: Aug. 9, 2022

(54) SIDE FOLDING TOW BEHIND MOTORCYCLE TRANSPORTER

(71) Applicant: Jeffrey Lynn Doelitsch, Rosharon, TX (US)

(72) Inventor: Jeffrey Lynn Doelitsch, Rosharon, TX (US)

( * ) Notice: Subject to any disclaimer, the term of this patent is extended or adjusted under 35 U.S.C. 154(b) by 0 days.

(21) Appl. No.: 16/222,324

(22) Filed: Dec. 17, 2018

(65) Prior Publication Data

US 2020/0189481 A1 Jun. 18, 2020

(51) Int. Cl.
| | |
|---|---|
| *B60R 9/10* | (2006.01) |
| *B60R 9/06* | (2006.01) |
| *B60P 3/06* | (2006.01) |

(52) U.S. Cl.
CPC ............. *B60R 9/10* (2013.01); *B60R 9/06* (2013.01); *B60P 3/06* (2013.01)

(58) Field of Classification Search
CPC ............ B60R 9/10; B60R 9/06; B60P 3/06
USPC .................................... 414/462–466
See application file for complete search history.

(56) References Cited

U.S. PATENT DOCUMENTS

| | | | | |
|---|---|---|---|---|
| 3,458,073 A | * | 7/1969 | Dawson ................ | B60R 9/10 414/462 |
| 3,586,188 A | * | 6/1971 | Cambell ............... | B60R 9/06 414/462 |
| 3,837,513 A | | 9/1974 | Adamek | |
| 3,976,213 A | * | 8/1976 | Ball ...................... | B60P 3/1025 414/462 |
| 4,725,183 A | * | 2/1988 | Smillie, III ........... | B60R 5/04 187/244 |
| 4,763,914 A | | 8/1988 | Lemmons | |
| 5,145,308 A | * | 9/1992 | Vaughn ................. | B60P 3/125 280/402 |
| 5,366,338 A | | 11/1994 | Mortensen | |
| 5,462,398 A | | 10/1995 | Hymer | |
| 5,482,424 A | * | 1/1996 | Jones ................... | A61G 3/0209 224/510 |
| 5,531,560 A | | 7/1996 | Bartholomew | |
| 5,620,197 A | | 4/1997 | Howes | |
| 5,674,044 A | * | 10/1997 | Ranes ................... | B60P 3/125 280/402 |
| 6,099,012 A | * | 8/2000 | Mortimer ............. | B60D 1/075 280/292 |
| 6,244,813 B1 | * | 6/2001 | Cataldo ................ | B60P 3/125 224/521 |
| 6,352,401 B1 | * | 3/2002 | LeMay ................. | B60P 3/125 280/402 |

(Continued)

*Primary Examiner* — Lynn E Schwenning
(74) *Attorney, Agent, or Firm* — Richard A. Fagin

(57) ABSTRACT

A motorcycle transporter includes a main frame comprising a hitch connection to couple to a tow hitch on a tow vehicle. A front tire carrier assembly is coupled to the main frame through a lift and comprises a rear tilting cradle hingedly coupled to a forward stationary cradle, each formed into a channel shaped to receive a motorcycle tire. The stationary cradle is coupled to the lift, a cradle side rail latch housing and a corresponding side rail latch coupled to the cradles to lock the rear tilting cradle in an open position and in a closed position. The open position enables the motorcycle tire to roll into the channel at ground level. The closed position restrains the motorcycle tire in the channel. The lift is arranged to raise the cradle from the ground level.

11 Claims, 9 Drawing Sheets

(56) References Cited

U.S. PATENT DOCUMENTS

| | | | |
|---|---|---|---|
| 7,704,034 B1 * | 4/2010 | Quigley, III | B60P 3/125 280/402 |
| 8,602,437 B1 * | 12/2013 | Morris | B60R 9/10 280/402 |
| 9,539,951 B1 * | 1/2017 | Levi | B60P 3/125 |
| 2007/0024024 A1 * | 2/2007 | Maynard | B60P 3/077 280/402 |

* cited by examiner

SIDE FOLDING TOW BEHIND MOTORCYCLE TRANSPORTER

CROSS REFERENCE TO RELATED APPLICATIONS

Not Applicable.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of vehicle towing apparatus. More particularly, the disclosure relates to apparatus for towing motorcycles connected, the apparatus connected to a tow vehicle by a hitch and hitch receiver.

Transporting or towing motorcycles can be hazardous. A problem associated with loading a motorcycle onto a towing device or trailer is that before a motorcycle approaches a stop it becomes unstable. As a result, riders have driven motorcycles up narrow ramps to load them onto trailers only to be without a surface to place their feet while on the ramp. When this occurs, if the rider tries to dismount quickly and get to the surface first to stabilize the motorcycle, the rider could become seriously injured or the motorcycle could be damaged.

Apparatus to load and transport motorcycles known in the art include those such as described in U.S. Pat. Nos. 5,620, 197, 5,366,338 and 5,145,308. The apparatus described in U.S. Pat. No. 5,145,308 uses a tilting cradle that secures the front tire into place, the cradle itself limits the type of motorcycle that can be transported due to lack of clearance between the aft portion of the cradle and the lower part of the front fender of a motorcycle. With respect to to different styles of motorcycles and motorcycle accessories, other towing devices have not proven able to secure to the front tire of a motorcycle with solid wheels (rather than spoke type wheels) because such devices require a continuous connection from one side of the tire, through the wheel, and then to the other side of the tire.

While many of the foregoing disclosed transport devices provide an easy way of getting the front tire into the transport, they may not stabilize the motorcycle while the rider dismounts or transitions from loading to securing the motorcycle such as in U.S. Pat. Nos. 5,620,197 and 5,145, 308. This leaves the user being required to both hold steady and secure the leaning weight of the motorcycle. Still other devices known in the art require that the power from the motorcycle engine to be used to push the front tire over a fulcrum into a cradle during loading such as described in U.S. Pat. No. 5,462,398. This may create a dangerous situation requiring power to be applied and then quickly stopped. Such device may load the motorcycle parallel to the tailgate of a vehicle also requiring the use of engine power to climb a ramp until the center of gravity of the motorcycle passes a fulcrum. This may be dangerous because not only does the rider lose stable footing, if the motorcycle should fall to the side opposite the tailgate the rider has no safe place to go. If the motorcycle falls toward the tailgate, the rider will be pinched between a hot engine and the tailgate. Other devices such as disclosed in U.S. Pat. No. 4,763,914 folds up to be stored in the luggage compartment of a vehicle, still requires two persons to safely secure the motorcycle and requires one to lift the device to be stored. Many vehicles today are very limited on luggage space.

U.S. Pat. No. 3,837,513 discloses a device that utilizes hydraulic power to lift a motorcycle to be transported behind a camper. This device permanently attaches to the camper and is not suitable for smaller passenger vehicle use. U.S. Pat. No. 5,531,560 discloses a device that lifts the motorcycle by using leverage and is first attached to the front of the motorcycle tire requiring at least two or more persons to safely load the motorcycle. Most devices known in the art require lifting for use or storage. Most of the devices known in the art may not be safe to leave attached to the tow vehicle due to the protuberance of the devices from the back of the vehicle and low visibility due to low elevation.

SUMMARY

A motorcycle transporter according to one aspect of the present disclosure includes a main frame comprising a hitch connection to couple to a tow hitch on a tow vehicle. A front tire carrier assembly is coupled to the main frame through a lift and comprises a rear tilting cradle hingedly coupled to a forward stationary cradle, each formed into a channel shaped to receive a motorcycle tire. The stationary cradle is coupled to the lift, a cradle side rail latch housing and a corresponding side rail latch coupled to the cradles to lock the rear tilting cradle in an open position and in a closed position. The open position enables the motorcycle tire to roll into the channel at ground level. The closed position restrains the motorcycle tire in the channel. The lift is arranged to raise the cradle from the ground level.

In some embodiments, the front tire carrier assembly comprises a first tire clamp arranged to extend from a retracted position to an extended position, the extended position enabling first tire clamp to compress against the motorcycle tire to lock the tire to the front tire carrier assembly.

In some embodiments, the first tire clamp is operable by a cable.

Some embodiments further comprise a second tire clamp coupled to the front tire carrier assembly vertically spaced apart from the first tire clamp and arranged to receive the motorcycle tire therein to stabilize the motorcycle tire in a vertical plane.

In some embodiments, the second tire clamp comprises a spring loaded, screw adjustable pair of opposed jaws.

In some embodiments, the lift further comprises a hinge to enable rotation of the front tire carrier assembly with respect to the main frame along a selected axis to enable folding the transport when not having a motorcycle in the transport.

Some embodiments further comprise transport wheels coupled to at least the front tire carrier assembly and arranged to contact the ground surface when the lift is extended so that the cradle is at the ground level.

Some embodiments further comprise a transport handle coupled to the main frame to enable movement of the transporter by a user by hand.

Some embodiments further comprise transport wheels coupled to the main frame and arranged to contact the ground surface when the transporter is disconnected from the tow vehicle.

In some embodiments, the lift comprises a screw jack.

Some embodiments further comprise a motor coupled to the screw jack to operate the screw jack.

In some embodiments, the side rail latch is operable by a cable.

Some embodiments further comprise a tie town rail coupled to the main frame.

DETAILED DESCRIPTION

Figure 1:
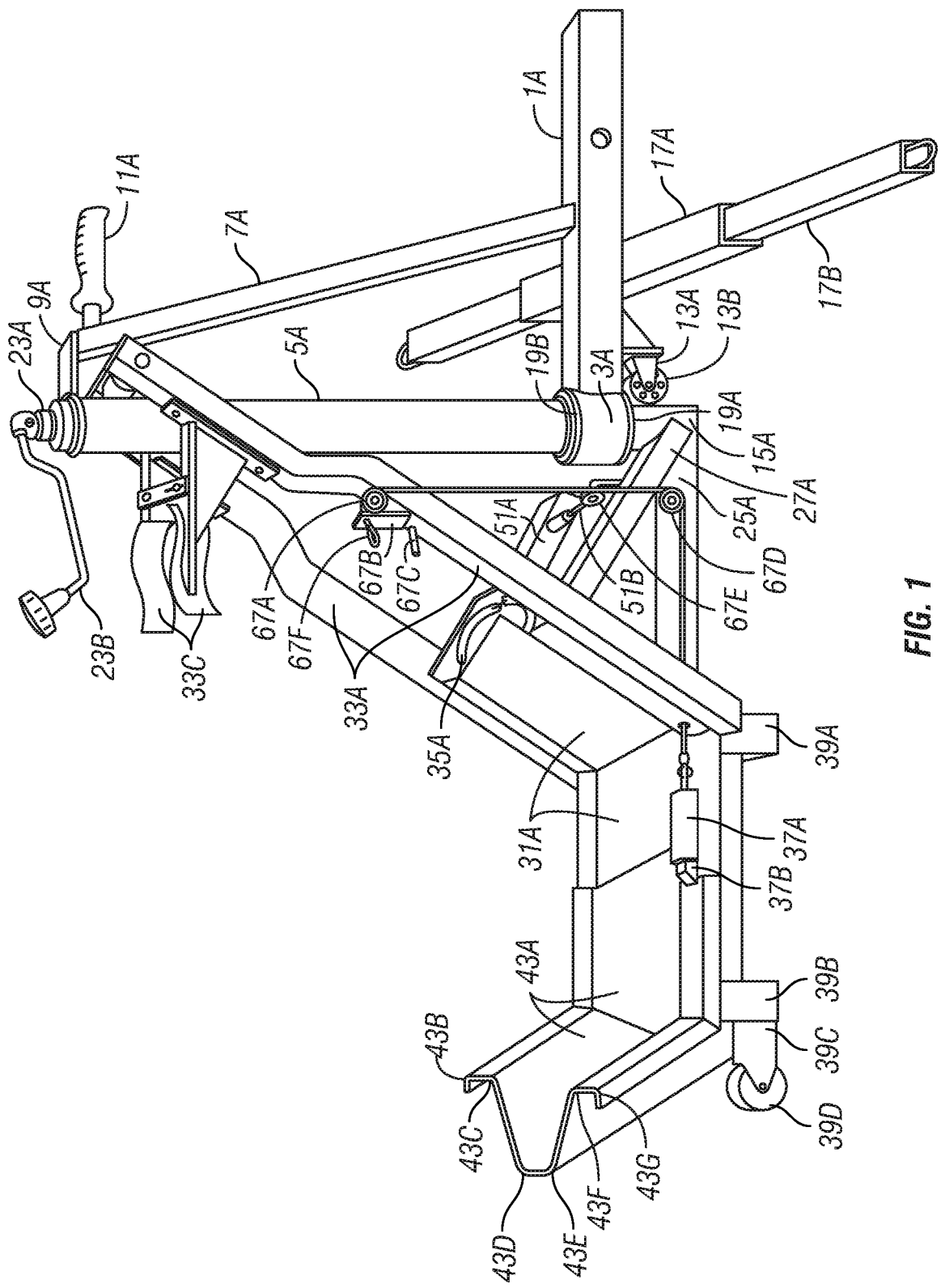
FIG. 1 is a perspective view of an example embodiment of an assembled motorcycle transporter in accordance with the present disclosure.

The following description will be made primarily with reference to FIG. 1. Some structures shown generally in FIG. 1 will be explained in greater detail and will be noted with reference to other of the drawing figures. A motorcycle transporter according to the present disclosure may comprise two main sections: A main frame and a front tire carry assembly.

The main frame provides connection between the front tire carry assembly and a towing vehicle, and may provide the capability for the front tire carry assembly to freely rotate about a vertical axis so that the front tire carry assembly may fold to be out of the way but remain attached to the tow vehicle when the transporter is not in use. The main frame may be connected to the front tire carry assembly using a lift such as a screw jack to enable lowering the tire carry assembly to load or unload the front tire of a motorcycle into or out of the transporter and subsequently raise the front tire for towing. The main frame thus enables a user to raise the front end of an already loaded motorcycle from the ground for transport and may also provide anchor points for securing the handlebars of the motorcycle.

Figure 5:
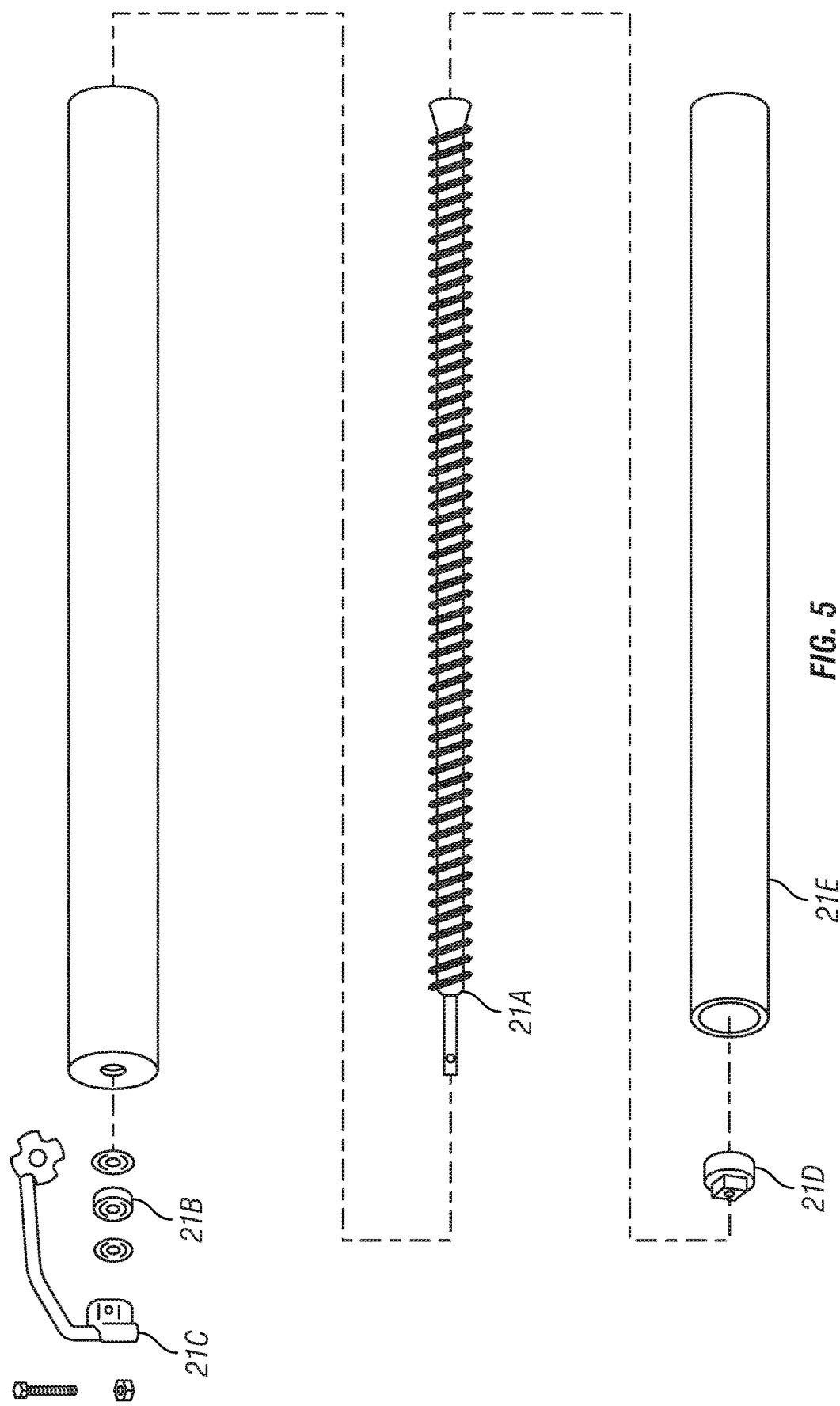
FIG. 5 is a perspective exploded view of a vertical rising inner cylinder, a vertical riser outer cylinder, a jack screw and connecting assemblies in accordance with the present disclosure.

The main frame may comprise the following primary components: a horizontal main and hitch (FIG. 1, 1A), a lower wheel support mount (FIG. 1, 13A) and wheel (FIG. 1, 13B), vertical support brace (FIG. 1, 7A), upper riser swivel (FIG. 1, 9A and FIG. 2, 10A), hand crank (FIG. 1, 23B) and crank bearing (FIG. 5, 21B), lower swivel (FIG. 1, 3A), lower swivel upper locking ring (FIG. 1, 19B), lower swivel lower locking ring (FIG. 1, 19A), lower main support (FIG. 1, 25A), fork supports (FIG. 1, 27A), the vertical rising inner cylinder assembly (FIG. 1, 15A) and jack screw (FIG. 5, 21A), vertical riser outer cylinder (FIG. 1, 5A), tie down receiver (FIG. 1, 17A) and tie down insert (FIG. 1, 17B) and transport handle (FIG. 1, 11A).

Figure 1A:
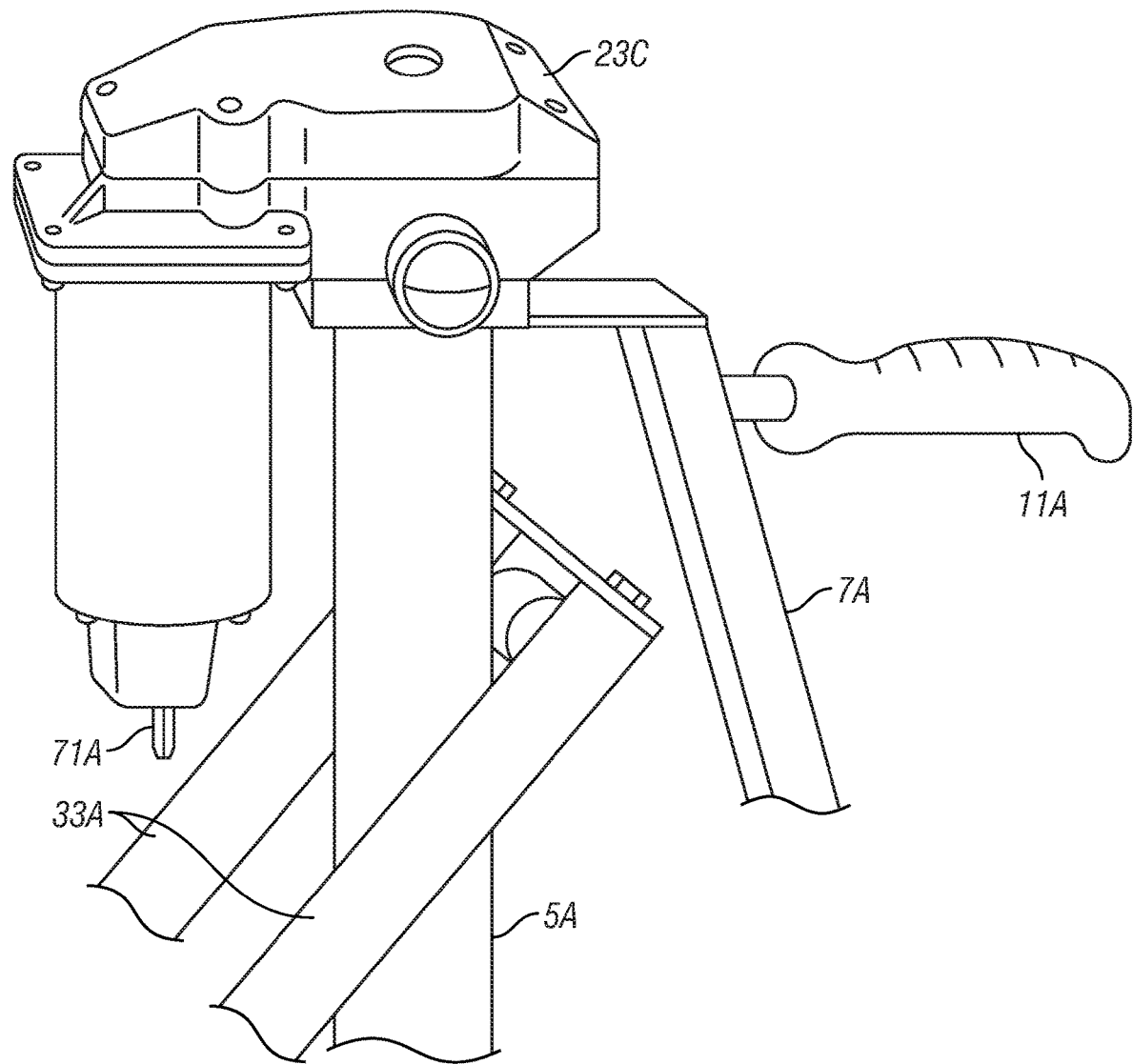
FIG. 1A shows an embodiment having a motor operated lift.

A Motorized Crank Assembly is shown in FIG. 1A. 23C, the motorized crank assembly substitutes for the hand crank (FIG. 1, 23A, 23B). The assembly may be a 12 volt motor assembly with an electrical connector that plugs directly in to the vehicles existing 7 blade trailer power plug outlet or other 12 volt power outlet. FIG. 1A at 71A shows a power switch, which controls a motor to cause the vertical riser outer cylinder (FIG. 1, 5A) to raise from the vertical rising inner cylinder (FIG. 1, 15A), resulting in the raising of the horizontal main and hitch (FIG. 1, 1A).

The front tire carry assembly may provide a path for loading the front tire of a motorcycle into the transporter. The front tire carry assembly may enable locking the front tire of a motorcycle into the transporter. The front tire carry assembly can facilitate disengagement of locking mechanisms which secure the front tire of the motorcycle into the transporter.

The front tire carry assembly may comprise the following primary components: two rear transport wheel mounts (FIG. 1, 39C) and corresponding rear transport wheels (FIG. 1, 39D), a rear tilting cradle and hinge (FIG. 1, 43A), a forward stationary cradle and hinge (FIG. 1, 31A), a cradle side rail latch housing (FIG. 1, 37A) and corresponding side rail latch (FIG. 1, 37B), an automatic locking mechanical tire clamp housing and assembly (FIG. 1, 35A), front forks (FIG. 1, 33A), vertical tire stabilizer clamp assembly (FIG. 1, 33C), upper fork roller assembly (FIG. 2, 33B), and cable and pulley latch release assembly (FIG. 1, 67A through 67F).

A horizontal main and hitch (FIG. 1, 1A) may be made from a straight section of square cross-section tubing having a forward end capable of connecting with a vehicle tow hitch receiver, pictured in FIG. 1. The present embodiment may use a conventional receiver made to install and pin into a hitch receiver. The aft end of the horizontal main and hitch (FIG. 1, 1A) terminates into a Lower Swivel (FIG. 1, 3A) that is in the form of a vertically aligned cylinder with an inside diameter sufficient to fit securely around the outside diameter of a Vertical Riser Outer Cylinder (FIG. 1, 5A). Fixed to the upper side of the Horizontal Main and Hitch (FIG. 1, 1A) and extending in an upward direction extending aft is a Vertical Support Brace (FIG. 1, 7A) which terminates near its uppermost end into an Upper Riser Swivel (FIG. 1, 9A). The upper riser swivel (FIG. 1, 9A) may be in the form of a flat plate that has a circular void (FIG. 2, 10A) within it of a sufficient inside diameter to allow the vertical riser outer cylinder (FIG. 1, 5A) to pass through. The upper riser swivel (FIG. 1, 9A and FIG. 2, 10A) has a small enough inside diameter to fit securely around the vertical riser outer cylinder (FIG. 1, 5A) while allowing the vertical riser outer cylinder to rotate. Affixed to the foreside of the Vertical Support Brace (FIG. 1, 7A) may be affixed a Transport Handle (FIG. 1, 11A) to enable the user to manually move the transporter.

A Lower Wheel Support Mount (FIG. 1, 13A) may be welded to the underside of the Horizontal Main and Hitch (FIG. 1, 1A) at the aft end just before the Lower Swivel (FIG. 1, 3A). A Lower Support Wheel (FIG. 1, 13B) may be fastened to the Lower Wheel Support Mount (FIG. 1, 13A) so that the lower support wheel rides against the side of a Vertical Rising Inner Cylinder (FIG. 1, 15A), thereby adding support.

A Tie Down Receiver (FIG. 1, 17A) may be fixed to the underside of the Horizontal Main and Hitch (FIG. 1, 1A) just forward of the Lower Wheel Support Mount (FIG. 1, 13A). A Tie Down Insert (FIG. 1, 17B) may be made from square tubing having rings welded on its ends and that slides into the Tie Down Receiver (FIG. 1, 17A). The rings may serve as anchor points for tie downs that secure handlebars of the motorcycle during transport. The tie down insert (FIG. 1, 17B) may serve as an anchor point for securing the folded transporter when it is not being used to transport a motorcycle. The tie down insert (FIG. 1, 17B) may be held in place by a bolt with a ninety degree shank (FIG. 2, 18A, 18B) threading through a threaded hole (not shown) on the tie down receiver (FIG. 1, 17A).

The Vertical Riser Outer Cylinder (FIG. 1, 5A) has an upper end fitting through the Upper Riser Swivel (FIG. 1, 9A) and a lower end fitting through and terminating just below the Lower Swivel (FIG. 1, 3A) providing enough room on the section of the Vertical Riser Outer Cylinder (FIG. 1, 5A) that protrudes beneath the Lower Swivel (FIG. 1, 3A) for a Lower Swivel Lower Locking Ring (FIG. 1, 19A and FIG. 2, 20A) to be welded to the Vertical Riser Outer Cylinder (FIG. 1, 5A) preventing upward travel of the Vertical Riser Outer Cylinder (FIG. 1, 5A). A Lower Swivel Upper Locking Ring (FIG. 1, 19B and FIG. 2, 20B) is fixed to the Vertical Riser Outer Cylinder (FIG. 1, 5A) just above the Lower Swivel (FIG. 1, 3A) preventing the Vertical Riser Outer Cylinder from traveling downward.

The upper end of the Vertical Riser Outer Cylinder (FIG. 1, 5A) may be capped having a round hole in the center of the cap allowing for a Jack Screw (FIG. 5, 21A) to pass through and thread through a threaded cap (FIG. 5, 21D) on the upper end of the Vertical Rising Inner Cylinder (FIG. 1, 15A and FIG. 5, 21E). The upper end of the Jack Screw (FIG. 5, 21A) passes through a Crank Bearing (FIG. 1, 23A and FIG. 5, 21B) which is between two washers and is fixed to a Hand Crank (FIG. 1, 23B and FIG. 5, 21C) so that rotating the hand crank will cause the Vertical Rising Inner Cylinder (FIG. 1, 15A) to travel upward or downward inside of the Vertical Riser Outer Cylinder (FIG. 1, 5A).

The lower end of the Vertical Rising Inner Cylinder (FIG. 1, 15A) connects to a Lower Main Support (FIG. 1, 25A) and Fork Supports (FIG. 1, 27A) so that the upward and downward travel of the Vertical Rising Inner Cylinder (FIG. 1, 15A) causes a front tire carry assembly to move up or down.

The Tire Cradle has two main components, a Forward Stationary Cradle (FIG. 1, 31A) and a Rear Tilting Cradle (FIG. 1, 43A). The forward stationary cradle and the rear tilting cradle may be made from pressed steel both having, for example, six bends across its latitudinal axis as depicted in FIG. 1, (i.e., FIGS. 1, 43B, 43C, 43D, 43E, 43F, and 43G) so as to form a channel with sufficient space for a tire to fit within the channel between (e.g., FIGS. 1, 43C and 43F) channel sides, and upper rails.

The sides of the channel between FIGS. 1, 43D and 43C and also between FIGS. 1, 43E and 43F creating the Tire Cradle may extend upward and outward at an obtuse angle with the uppermost portion of the sides bending again to create upper side rails (FIG. 1, 43C to 43B and FIG. 1, 43F to 43G) parallel to the lower channel. Outer edges of the upper rails of the forward stationary cradle and the rear tilting cradle bend down adding strength and ergonomics to the channel.

The forward stationary cradle (FIG. 1, 31A) and the Rear Tilting Cradle (FIG. 1, 43A) of the Tire Cradle may have an obtuse angled vertex (FIG. 2, 43H) perpendicular to the longitudinal axis of the embodiment causing the channel to resemble an open "V." By facing the forward stationary cradle aft and facing the rear tilting cradle forward and laying one side of the rear tilting cradle flat inside the forward stationary cradle the two pieces together form a shape resembling the lower three sides of an octagon.

Figure 6:
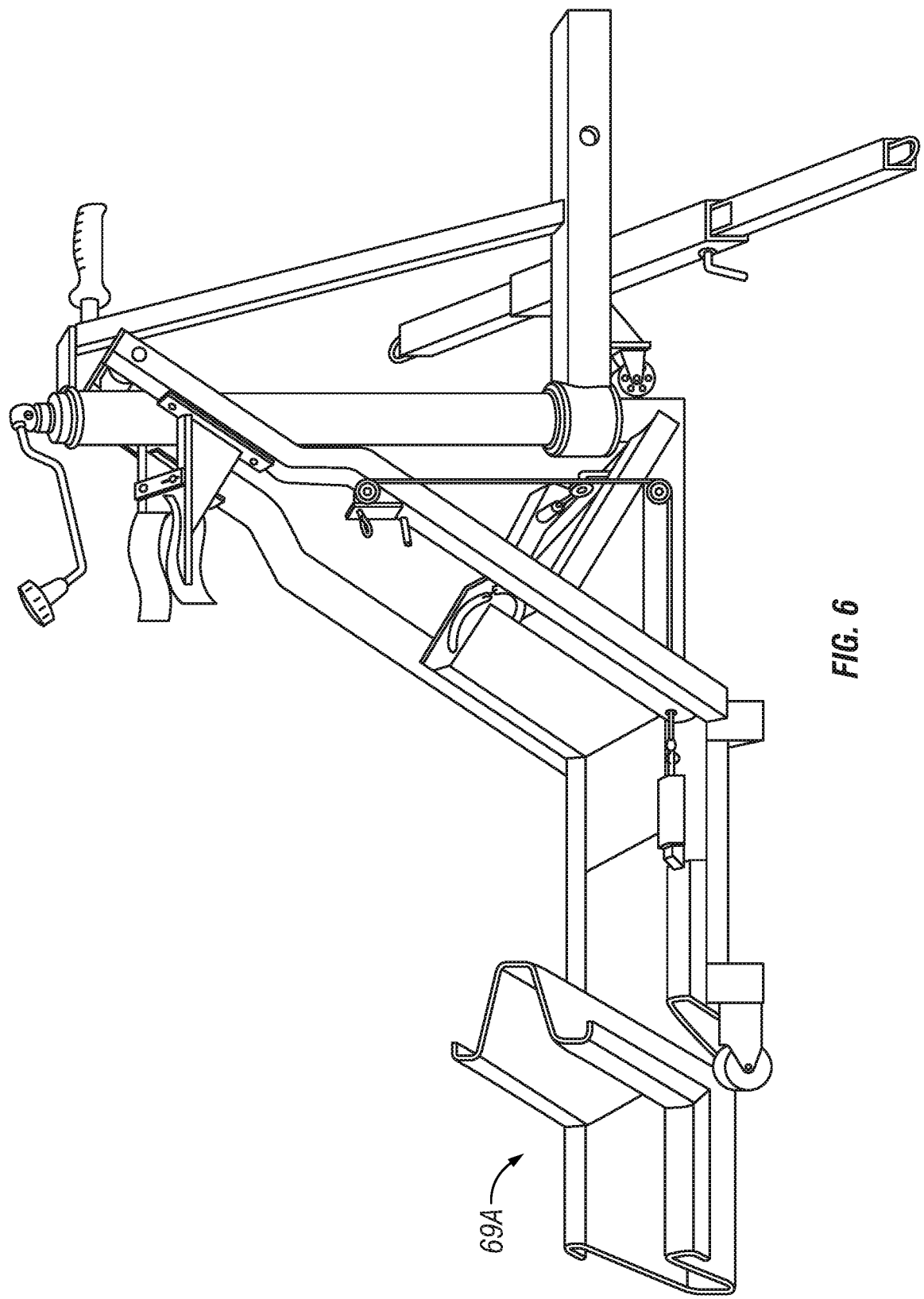
FIG. 6 is a perspective view of an assembled motorcycle transporter showing the rear tilting cradle rotated to the loading position.
Figure 8:
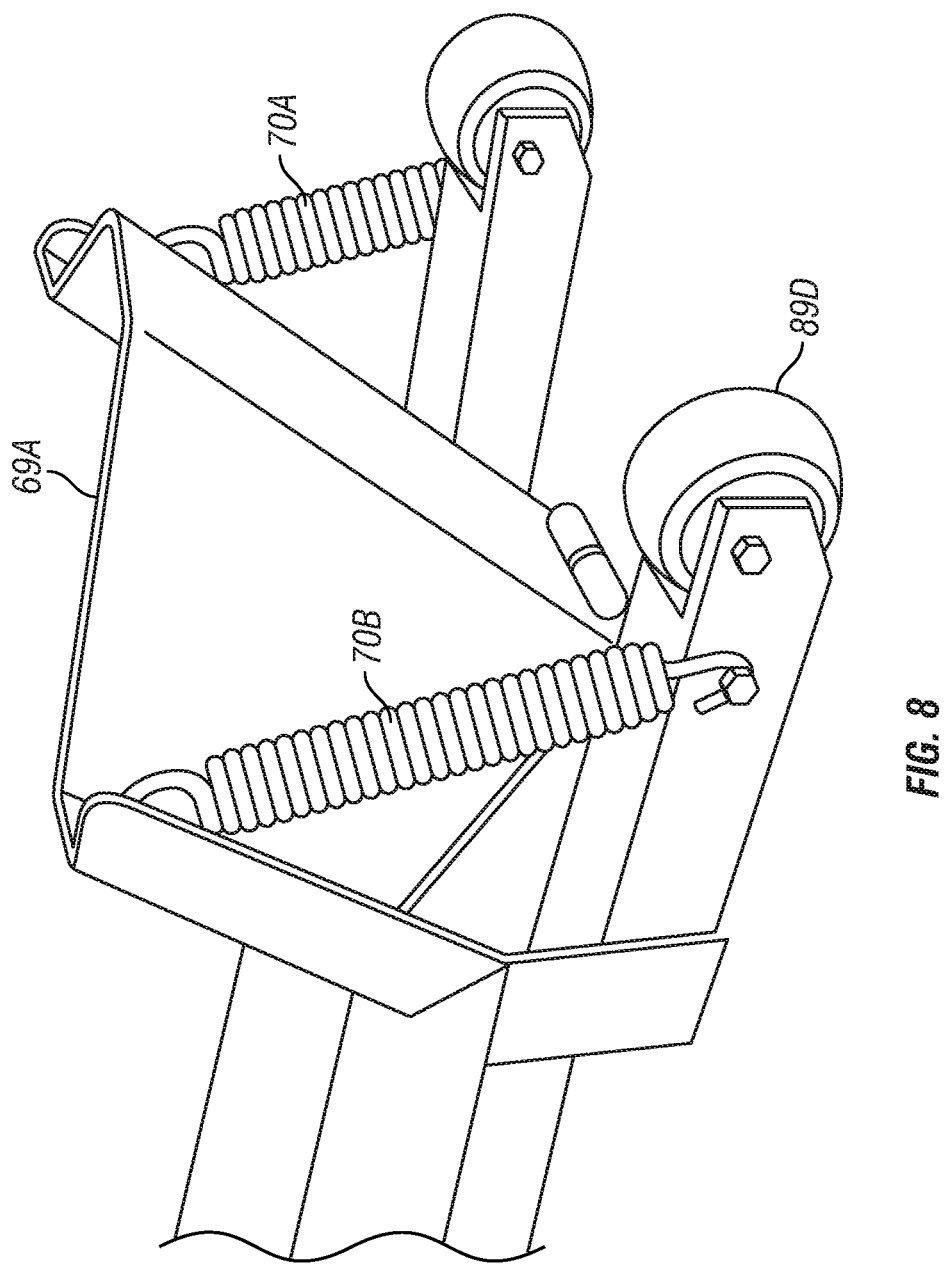
FIG. 8 shows an embodiment of a spring assembly.

A Spring Assembly may attach to the bottom of the rear tilting cradle (FIG. 6, 69A). Referring to FIG. 8, at 70A, 70B springs on each side of the cradle, allowing a smooth, and automatic drop of the rear tilting cradle when release cable (FIG. 1, 67F) is engaged.

The Forward Stationary Cradle (FIG. 1, 31A) may be welded to the Lower Main Support (FIG. 1, 25A), front forks (FIG. 1, 33A), and an Automatic Locking Mechanical Tire Clamp Housing (FIG. 1, 35A) and is stationary and forms the forward component of the tire cradle. Near the trailing edge of the Forward Stationary Cradle (FIG. 1, 31A) and on the upper side rail, a Cradle Side Rail Latch Housing (FIG. 1, 37A) is fixed. Below the vertex of the Forward Stationary Cradle (FIG. 1, 31A), a Forward Cradle Cross member (FIG. 1, 39A) extends perpendicular to the cradle channels and may be welded at the lowermost bends of the channel and at each outer edge of the Forward Stationary Cradle (FIG. 1, 31A).

On the trailing edge of the channel of the Forward Stationary Cradle (FIG. 1, 31A) the Forward Stationary Cradle Hinge (FIG. 2, 41A) is fixed. The bottom portion of the Forward Stationary Cradle (FIG. 1, 31A) extends aft to beneath the vertex of the Rear Tilting Cradle (FIG. 1, 43A) so that the Rear Tilting Cradle (FIG. 1, 43A) is resting inside the bottom channel of the Forward Stationary Cradle (FIG. 1, 31A). A leading edge of an upper side rail (FIG. 2, 43J) of the Rear Tilting Cradle (FIG. 1, 43A) stops just aft of a Cradle Side Rail Latch Housing (FIG. 1, 37A).

The Rear Tilting Cradle (FIG. 1, 43A) has a portion of a hinge fixed at a cradle vertex (FIG. 2, 45A) on the underside of the lower channel so that it aligns with the forward stationary cradle hinge (FIG. 2, 41A) that is fixed to the trailing edge of the Forward Stationary Cradle (FIG. 1, 31A). By pinning the two aforementioned hinge sections together on the Forward Stationary Cradle (FIG. 1, 31A) and the Rear Tilting Cradle (FIG. 1, 43A) the Rear Tilting Cradle (FIG. 1, 43A) becomes capable of rotating aft and provides a path for loading the tire into the cradle as shown (FIG. 6, 69A).

Figure 2:
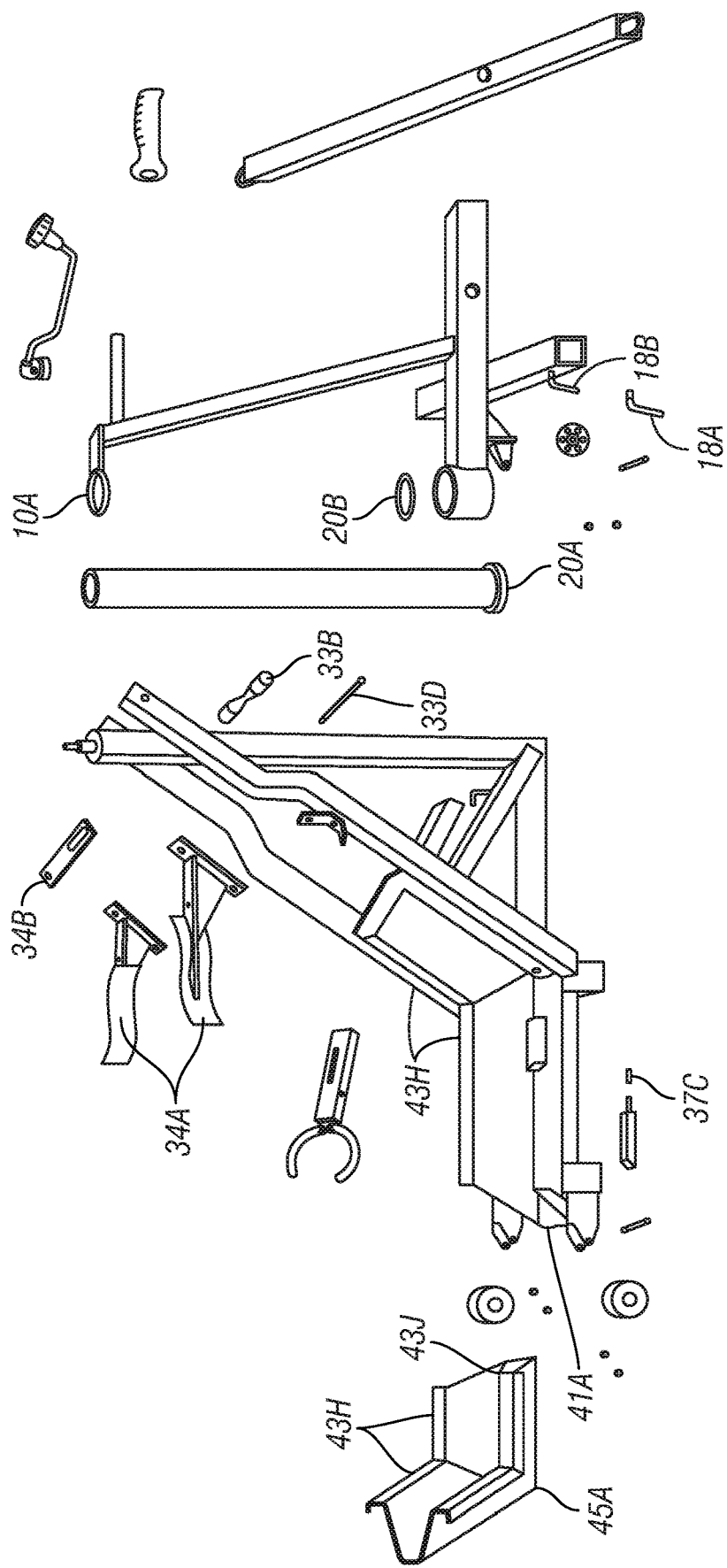
FIG. 2 is a perspective exploded view of a motorcycle transporter in accordance with the present disclosure.

As the center of gravity of a tire moves forward past the vertex of The Rear Tilting Cradle (FIG. 1, 43A) it forces the Rear Tilting Cradle (FIG. 1, 43A) to rotate forward into the Forward Stationary Cradle (FIG. 1, 31A). As the leading edge of the upper side rail (FIG. 2, 43J) of the Rear Tilting Cradle and Hinge (FIG. 1, 43A) travels down it comes into contact with the ramped portion of a Side Rail Latch (FIG. 1, 37B) causing the latch to travel forward compressing a Side Rail Latch Spring (FIG. 2, 37C). Once the leading edge of the upper side rail of the Rear Tilting Cradle (FIG. 1, 43A) moves below the Side Rail Latch (FIG. 1, 37B), the Side Rail Latch (FIG. 1, 37B) returns to an aft position thereby locking the Rear Tilting Cradle and Hinge (FIG. 1, 43A) into transport position.

An Aft Cradle Cross Member (FIG. 1, 39B), Rear Transport Wheel Mount (FIG. 1, 39C) and Rear Transport Wheel (FIG. 1, 39D) are mounted to the underside of the trailing edge of the Forward Stationary Cradle (FIG. 1, 31A) just before the hinge.

Atop the forward leading edge of the Forward Stationary Cradle and Hinge (FIG. 1, 31A) is an Automatic Locking Tire Clamp Housing and Assembly (FIG. 1, 35A). Two arcs acting as jaws (FIG. 3, 47A, 47B) for gripping a tire hinge to a clamp jaws hinge (FIG. 3, 49A) on the Tire Clamp Shaft (FIG. 3, 57A) which travels inside of a tire clamp shaft house (FIG. 1, 51A). The open side of the jaws face the tire being loaded into the tire cradle.

The tire clamp seat (FIG. 4, 53A) for the Automatic Tire Clamp Jaws (FIG. 3, 47A 47B) has diverging sides with the widest point between the two sides facing aft toward a tire to be loaded and the narrowest point between the two sides joining to an aft facing back wall. The back wall of the seat for the Automatic Tire Clamp Jaws spans between the left and right sides of the seat and has a centered void providing thoroughfare for the Tire Clamp Shaft (FIG. 3, 57A) to travel fore and aft in the Tire Clamp Shaft house (FIG. 1, 51A). The left and right side of the seat for the Automatic Tire Clamp Jaws has a threaded hole just aft of the aft facing back wall providing thoroughfare for Automatic Tire Clamp adjusting bolts (FIG. 4, 59A). The Automatic Tire Clamp Adjusting Bolts (FIG. 4, 59A) are positioned so that they act upon the outside arc of the tire clamp jaws when the tire clamp jaws are pressed toward the back wall of the seat.

The tire clamp shaft (FIG. 3, 57A) has a clamp locking pin hole (FIG. 3, 61A) traveling through the shaft perpendicular to the shaft providing access for a spring loaded clamp locking pin (FIG. 4, 63A) mounted on the tire clamp shaft casing (FIG. 1, 51A) to hold the tire clamp shaft in place during transport of a motorcycle. The tire clamp shaft (FIG. 3, 57A) has an elongated slot (FIG. 3, 57B) which allows for a keeper (FIG. 4, 57 C) to prevent the tire clamp shaft (FIG. 3, 57A) from over-travel.

Figure 3:
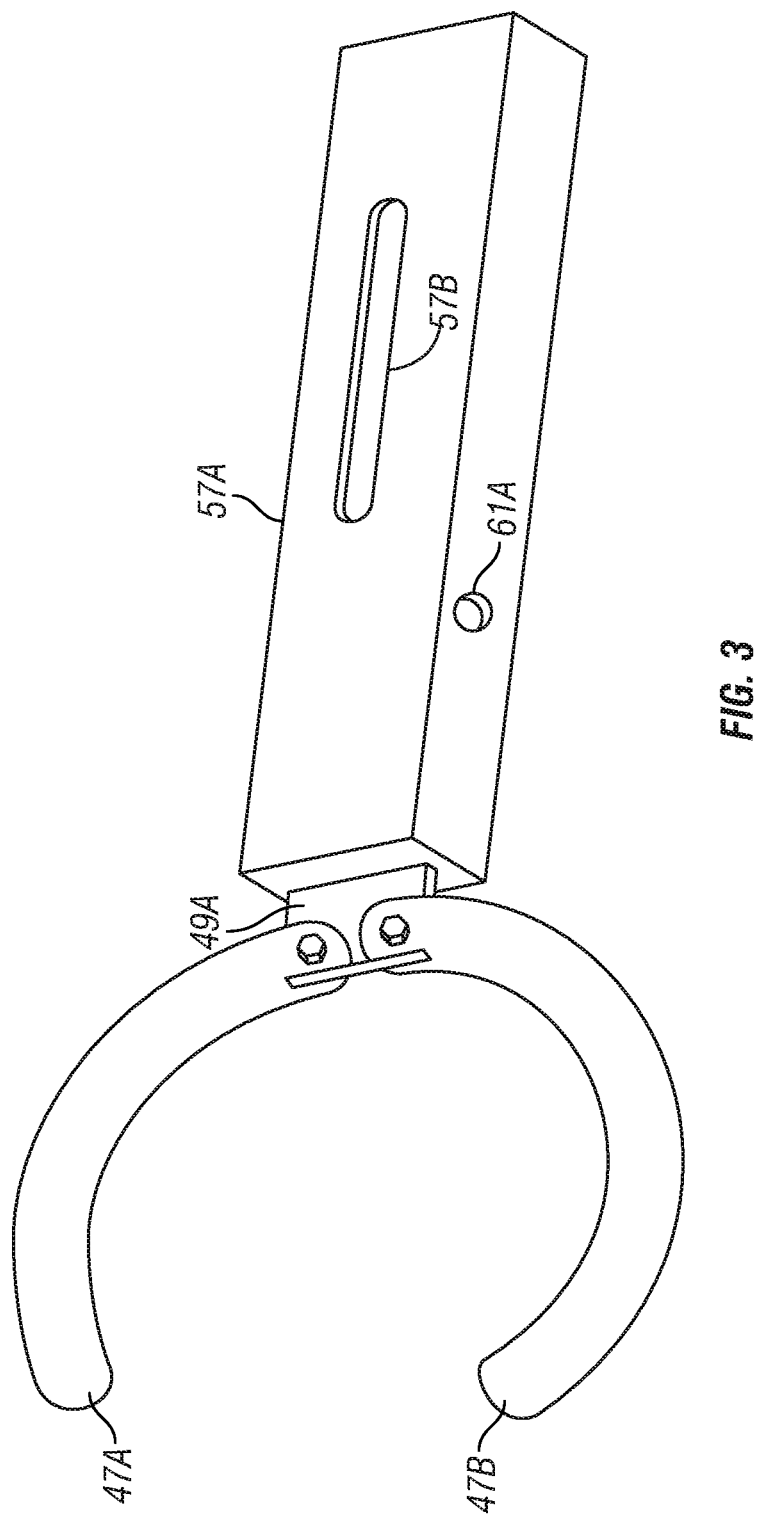
FIG. 3 is a perspective view showing a close up view of an automatic locking tire clamp jaws and shaft in accordance with the present disclosure.
Figure 4:
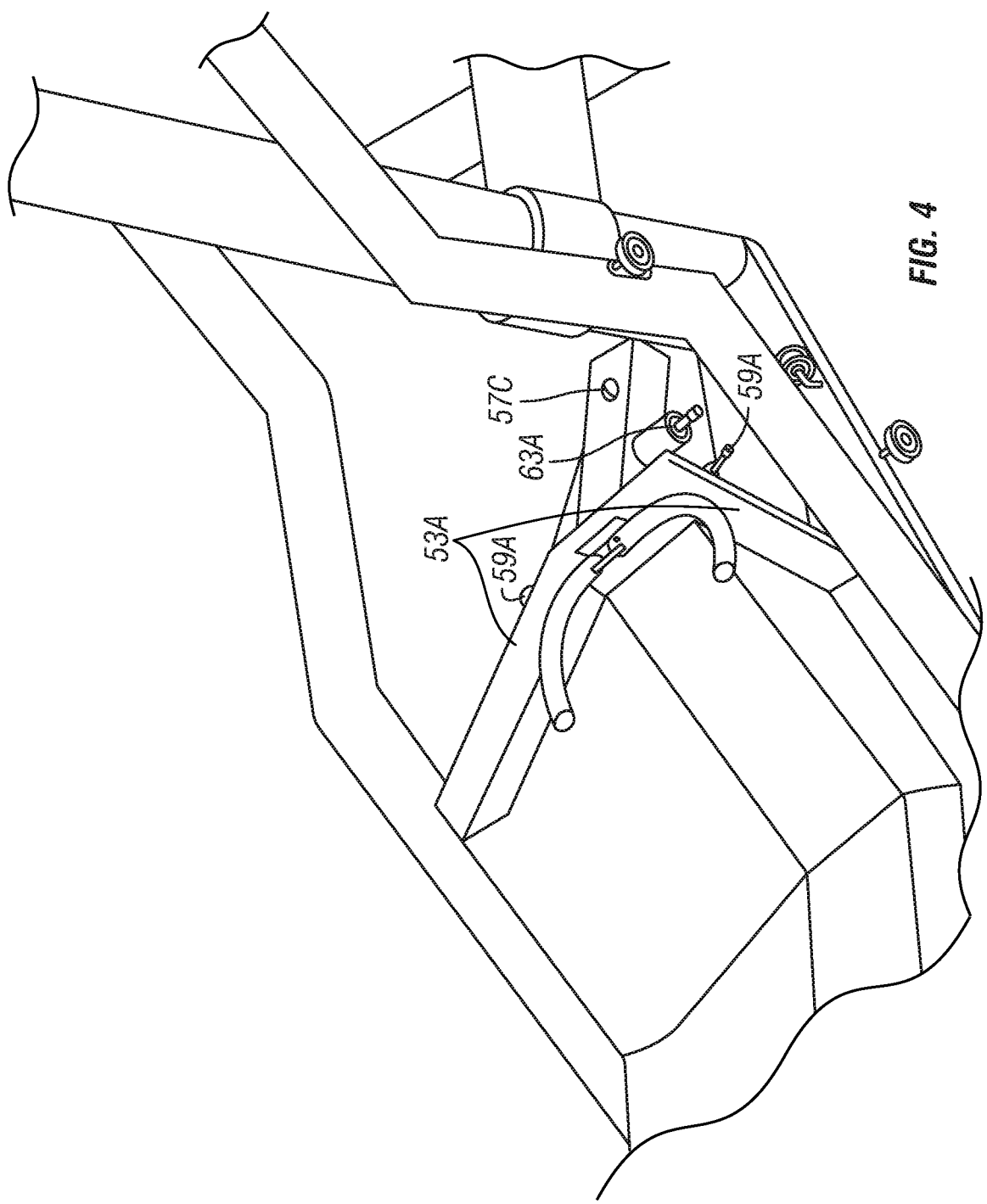
FIG. 4 is a perspective, close up view of an automatic locking tire clamp seat and housing assembly in accordance with the present disclosure.

As the front tire is rolled into the tire cradle the front side of the tire comes into contact with the inner arcs of the Automatic Locking Tire Clamp Jaws (FIG. 3, 47A, 47B). As the forward movement of the tire applies force to the Automatic Locking Tire Clamp Jaws (FIG. 3, 47A, 47B), the tire clamp jaws travel forward in the tire clamp jaws seat (FIG. 4, 53A). During the forward travel of the jaws (FIG. 3, 47A, 47B) in the seat (FIG. 4, 53A), the adjusting bolts (FIG. 4, 59A) act upon the outer arcs of the jaws causing them to travel toward each other resulting in a gripping of the tire.

Simultaneously the tire clamp shaft (FIG. 3, 57A) that is attached to the tire clamp jaws travels forward inside of the tire clamp shaft casing (FIG. 1, 51A) until the clamp locking pin hole (FIG. 3, 61A) in the shaft aligns with the spring loaded locking pin (FIG. 4, 63A) on the casing forcing the shaft to be locked in the forward position maintaining the tire clamp jaws in the closed position firmly holding the tire. The front forks (FIG. 1, 33A) are fixed to both sides of the forward stationary cradle (FIG. 1, 31A) and travel upward and forward at an angle toward the transport handle (FIG. 1, 11A). As the front forks (FIG. 1, 33A) travel upward they angle in toward each other and terminate just past the vertical riser outer cylinder (FIG. 1, 5A). Near the uppermost end of the front forks (FIG. 1, 33A) and on the forward facing side of the vertical riser outer cylinder (FIG. 1, 5A) an upper fork roller assembly (FIG. 1, 33B) spans between the front forks and connects the front forks (FIG. 1, 33A).

The upper fork roller assembly (FIG. 1, 33B) is a horizontally oriented, generally hour glass shaped steel roller that conforms to the shape of the vertical riser outer cylinder (FIG. 1, 5A). The upper fork roller has a centered circular void running through it lengthwise for a long bolt (FIG. 2, 33D) to pass through. The long bolt (FIG. 2, 33D) connects the front forks (FIG. 1, 33A) to the upper fork roller (FIG. 2, 33B) while allowing the upper fork roller (FIG. 2, 33B) to freely move about the horizontal plane and rotate about the vertical axis. This allows the front tire carry assembly to travel up and down when the hand crank (FIG. 1, 23B) is turned while maintaining a supporting contact upon the Vertical Riser Outer Cylinder (FIG. 1, 5A).

The upper fork roller assembly provides support to the front tire carry assembly by transferring the counter clockwise rotational load presented by the weight of a motorcycle against the vertical riser outer cylinder (FIG. 1, 5A). The vertical riser outer cylinder (FIG. 1, 5A) then transfers the load to the upper riser swivel (FIG. 1, 9A) that is supported by the vertical support brace (FIG. 1, 7A). The vertical support brace (FIG. 1, 7A) may be welded to the horizontal main and hitch (FIG. 1, 1A).

Simultaneously a counterclockwise rotational force from the load is exerted below the horizontal main and hitch (FIG. 1, 1A) creating a forward acting force. This load is transferred to the lower support wheel (FIG. 1, 13B) which is mounted to the lower wheel support mount (FIG. 1, 13A) that may be welded to the horizontal main and hitch (FIG. 1, 1A).

A vertical tire stabilizer spring clamp assembly (FIG. 1, 33C) connects to each side of the front forks (FIG. 1, 33A) aft of the vertical riser outer cylinder (FIG. 1, 5A). When loaded, the upper portion of a tire will insert into the vertical tire stabilizer spring clamp assembly (FIG. 1, 33C) and stabilize the front tire of a motorcycle by holding the tire at a higher point thereby resisting lateral roll of the motorcycle, or expressed differently, to maintain orientation of the motorcycle tire in a particular plane (vertical). The width between the vertical tire stabilizer spring clamp assembly jaws (FIG. 2, 34A) may be adjusted by tightening the jaws against a clamp adjustment plate (FIG. 2, 34B).

Figure 7:
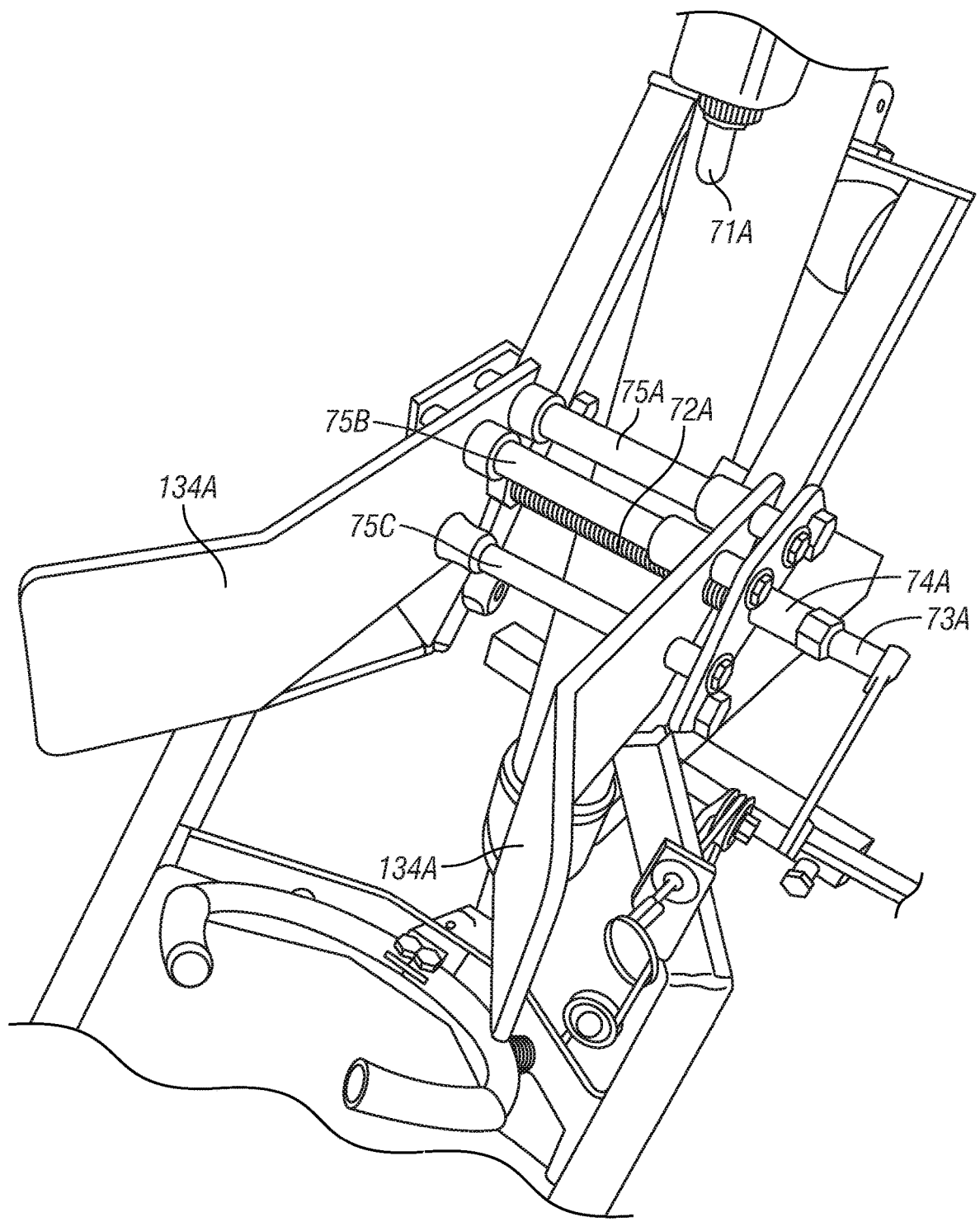
FIG. 7 shows an embodiment of a vertical tire stabilizer.

An embodiment of a Vertical Tire Stabilizer shown in FIG. 7 allows adjustment via a hand crank. Once the stabilizer is set to width of tire, no further adjustment needs to be made unless changing tire size. At 134A is shown vertical tire stabilizer clamp assembly jaws (FIG. 7, 134A). 72A shows a screw adjustment assembly that allows the vertical tire stabilizer jaws 134A to move along the adjustment tracks 75A, 75B, 75C when the stabilizer hand crank 73A is adjusted. The stabilizer hand crank 73A attaches to the device through a stabilizer crank casing 74A.

An engage and release pulley (FIG. 1, 67A), cable holding plate (FIG. 1, 67B), and cable holding pin (FIG. 1, 67C) are mounted to one side of the front forks (FIG. 1, 33A). Similarly a second engage and release pulley (FIG. 1, 67 D) is mounted to the fork support (FIG. 1, 27A), and a third engage and release pulley (FIG. 1, 67E) is mounted on the upper side of the fork support (FIG. 1, 27A). An engage and release cable (FIG. 1, 67F) having a looped end travels through the cable holding plate (FIG. 1, 67B), across the three pulleys and connects to the side rail latch pin (FIG. 1, 37A) and the tire clamp spring loaded locking pin (FIG. 4, 63A) to provide a means for easy activation or release of the two locking mechanisms. By pulling the looped end of the engage and release cable (FIG. 1, 67F) at the cable holding plate (FIG. 1, 67B) and connecting the looped end of the cable over the cable holding pin (FIG. 1, 67C) the spring loaded side rail latch (FIG. 1, 37B) and the tire clamp spring loaded locking pin (FIG. 4, 63A) are retracted and held from a locked position to facilitate easy unloading by one person.

The components of present embodiment may be constructed of carbon steel or any other material capable of maintaining structural integrity during use. For example lightweight material such as but not limited to aluminum alloy can be used in the manufacture of some of the parts of the present embodiment, some components may use polymers. The locking mechanisms of the front tire carry assembly can comprise any arrangement of mechanical linkages provided they lock and unlock the tire securing features. The apparatus for raising and lowering the transporter can comprise other lifting devices such as but not limited to electric motors, hydraulic cylinders, or hand jacks, provided the transporter can still be raised and lowered while freely rotating about the same axis. While the stationary parts of the present embodiment may be joined by welding, the present embodiment is not limited to welded construction. Bolts or other fastening hardware could be used to equal effect.

Operation

Due to the overall combination of structural features of the present embodiment, operation of the present embodiment will be described from being moved from storage to being installed onto a vehicle intended to tow a motorcycle. Next will be described the operation of the present embodiment during the loading of a motorcycle followed by the operation of unloading a motorcycle from the present embodiment. Then will be described operation of the present embodiment being towed while not in use to transport a motorcycle. Finally will be described the operation of removing the transporter from the tow vehicle and returning it to be stored.

Moving the transporter from storage to a vehicle intended to tow a motorcycle is made easy not only by the small size and light weight of the transporter, but also by the rear transport wheels (FIG. 1, 39D) and transport handle (FIG. 1, 11A). A user may remove the transporter from a storage space and then lift the aft section of the transporter slightly off the ground and roll the transporter on the rear transport wheels to where required in either a pulling or pushing motion.

Upon positioning the transporter behind a tow vehicle, the horizontal main and hitch (FIG. 1, 1A) may be raised to the appropriate elevation for connection to the receiver hitch of the tow vehicle. The lower main support (FIG. 1, 25A) will initially be resting flat on the ground. By rotating the hand crank (FIG. 1, 23B) or operating the motor, the vertical riser outer cylinder (FIG. 1, 5A) will raise from the vertical riser inner cylinder (FIG. 1, 15A) resulting in the raising of the horizontal main and hitch (FIG. 1, 1A). Upon reaching the necessary elevation for connection to the receiver hitch of the tow vehicle, the hitch of the transporter is inserted into the receiver hitch and is pinned in place. With the transporter connected to the tow vehicle and the lower main support resting on the ground, the user is now ready to load a motorcycle into the transporter.

By the user pulling the looped end of the engage and release cable (FIG. 1, 67F) and attaching it to the cable holding pin (FIG. 1, 67C), the locking mechanisms of the tire carry assembly will be released allowing the rear tilting cradle (FIG. 1, 43A) to roll back into the open position for loading the motorcycle. The automatic locking tire clamp (FIG. 1, 35A) will be released and will be ready to lock onto a tire. Upon releasing the locking mechanisms and rolling the rear tilting cradle back into the loading configuration (FIG. 6, 69A), the looped end of the engage and release cable may be unhooked from the cable holding pin. This will allow the tire clamp spring loaded locking pin (FIG. 4, 63A) to be free to enter the clamp locking pin hole (FIG. 3, 61A) when the tire is pressed into the automatic locking tire clamp jaws (FIG. 3, 47A, 47B). Releasing the engage and release cable from the cable holding pin will also allow the side rail latch (FIG. 1, 37B) to lock the rear tilting cradle into the transport position when the tire is loaded into the cradle.

The tire cradle and automatic locking tire clamp are now ready to automatically lock into the secured for transport position once the front tire of the motorcycle is loaded into the transporter.

The user then rolls the front tire of the motorcycle forward into the tire cradle until the tire presses the automatic locking tire clamp (FIG. 1, 35A) to move the clamp into a locked position. At the same time the rear tilting cradle (FIG. 1, 43A) will rotate forward and lock behind the tire. Also at the same time the tire will press into the vertical tire stabilizer clamp assembly (FIG. 1, 33C). With the rear tilting cradle locked behind the tire and the automatic locking tire clamp locked onto the tire and the tire pressed into the vertical tire stabilizer clamp assembly the user may then let go of the motorcycle and move from the rear of the motorcycle to the front to raise the front tire off of the ground.

If the user has become familiar with the operation of the transporter and has already determined the length of the tie down straps required to safely secure the handlebars to the tie down inserts the user can save time by attaching tie down straps that are made to proper length prior to raising the tire carry section. Because the tie down insert is fixed to the horizontal main and hitch and remains stationary the tie down straps will tighten to the desired tension upon fully raising the tire carry section to transport position.

The front tire of the motorcycle is lifted from the ground when the user rotates the hand crank or operates the motor causing the jack screw to pull the vertical rising inner cylinder up into the vertical riser outer cylinder. Upon fully raising the vertical rising inner cylinder into the vertical riser outer cylinder the front tire of the motorcycle and the tire carry section of the transporter will be at a height safe for transport. With the tire at the proper elevation for transport the user may then safely prepare to further secure the motorcycle for transport. The user will typically not require any assistance from another person to stabilize the motorcycle because the cradle, automatic locking tire clamp, and the vertical tire stabilizer clamp firmly hold the motorcycle in place.

If the user does not already know the necessary length of the tie down straps and did not already attach tie down straps, the user can then safely secure the motorcycle handlebars to the tie down insert by attaching, for example, a ratcheting strap between each handlebar and the looped ends of the tie down insert. Upon securing the handlebars to the tie down insert the user may then tow the motorcycle. As may be readily determined, from storage of the transporter to being ready to tow the motorcycle, only one person is required for safe operation of the present embodiment.

When the user is ready to unload the motorcycle from the transporter, the user may first rotate the hand crank or operate the motor to lower the tire carry section so that the front tire of the motorcycle is also resting approximately at ground level. This will also cause the tension on the ratcheting straps attached to the tie down insert to be released. Upon fully lowering the tire carry section to the ground, the tie down straps may be removed from the handlebars and the tie down insert. The motorcycle will continue to remain stabilized even with the tie down straps removed because the motorcycle tire continues to be supported by the vertical tire stabilizer clamp.

As an added safety measure the user may place the motorcycle in gear so that it does not roll backward when the engage and release cable is pulled.

Next the user releases the rear tilting cradle side rail latch (FIG. 1,37B) and the automatic locking tire clamp locking pin (FIG. 1, 51B) by pulling the looped end of the engage and release cable (FIG. 1, 67F) and placing it over the cable holding pin (FIG. 1, 67C). The motorcycle will continue to be stabilized because the front tire will still be held securely by the vertical tire stabilizer clamp. Upon releasing the locking mechanisms mentioned above, the user may then place the motorcycle back into neutral and roll the motorcycle out of the transporter.

At this point the transporter can either be disconnected from the tow vehicle, or it can be secured to one side for out of the way transport. To disconnect the transporter from the tow vehicle the user will first close the rear tilting cradle and then release the engage and release cable from the cable holding pin. The rear tilting cradle will be locked into closed position. Next the user will remove the pin holding the hitch in the hitch receiver and slide the hitch out of the receiver. Then the user will utilize the transport handle to roll the transporter to the desired storage location.

If the user desires to allow the transporter to remain attached to the towing vehicle, the user may simply swing the tire carry section to one side and use a ratcheting strap to hold the tire carry section to the tie down insert (FIG. 1, 17B). Another method of securing the tire carry section to one side could use a simple hook and latch, the alignment of two holes and a locking pin or any other simple means of connection.

Although the description above contains many specific examples, these examples should not be construed as limiting the scope of the present disclosure but merely provide illustrations of possible embodiments. Thus the scope of the present disclosure should be determined by the appended claims and their legal equivalents, rather than by the examples given.

What is claimed is:

1. A motorcycle transporter comprising:
   a main frame comprising a hitch connection to couple to a tow hitch on a tow vehicle;
   a front tire carrier assembly coupled to the main frame through a lift, the front tire carrier assembly comprising a rear tilting cradle hingedly coupled to a forward stationary cradle each formed into a channel shaped to receive a motorcycle tire, the forward stationary cradle coupled to the lift, a cradle side rail latch housing and a corresponding side rail latch coupled to the cradles to lock the rear tilting cradle in an open position and in a closed position, the open position arranged to enable the motorcycle tire to roll into the channel at ground level, the closed position arranged to restrain the motorcycle tire in the channel;
   wherein the lift is arranged to raise the front tire carrier assembly from the ground level;
   wherein the front tire carrier assembly comprises a first tire clamp arranged to extend from a retracted position to an extended position, the extended position enabling first tire clamp to compress against the motorcycle tire to lock the tire to the front tire carrier assembly;
   a second tire clamp coupled to the front tire carrier assembly vertically spaced apart from the first tire clamp and arranged to receive the motorcycle tire therein to stabilize the motorcycle tire in a vertical plane; and
   wherein the second tire clamp comprises a spring loaded, screw adjustable pair of opposed jaws.

2. The transporter of claim 1 wherein the first tire clamp is releasable by a cable.

3. The transporter of claim 1 wherein the lift further comprises a swivel to enable rotation of the front tire carrier assembly with respect to the main frame along a selected axis to enable folding the transport when not having a motorcycle in the transport.

4. The transporter of claim 1 further comprising transport wheels coupled to at least the front tire carrier assembly and arranged to contact the ground surface when the lift is extended so that the cradle is at the ground level.

5. The transporter of claim 4 further comprising a transport handle coupled to the main frame to enable movement of the transporter by a user by hand.

6. The transporter of claim 4 further comprising transport wheels coupled to the main frame and arranged to contact the ground surface when the transporter is disconnected from the tow vehicle.

7. The transporter of claim 1 wherein the lift comprises a screw jack.

8. The transporter of claim 7 further comprising a motor coupled to the screw jack to operate the screw jack.

9. The transporter of claim 1 wherein the side rail latch is releasable by a cable.

10. The transporter of claim 1 further comprising a tie down rail coupled to the main frame.

11. The transporter of claim 1 further comprising at least one spring coupled between the rear tilting cradle and the main frame.

* * * * *